US006229797B1

(12) United States Patent
Cho (10) Patent No.: US 6,229,797 B1
(45) Date of Patent: *May 8, 2001

(54) CIRCUIT FOR ELIMINATING EXTERNAL INTERFERENCE SIGNALS IN CODE DIVISION MULTIPLE ACCESS MOBILE PHONE

(75) Inventor: Sun Cho, Suwon (KR)

(73) Assignee: Samsung Electronics Co., Inc. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/957,109

(22) Filed: Oct. 24, 1997

(30) Foreign Application Priority Data

Oct. 29, 1996 (KR) .................................... 96 49745

(51) Int. Cl.[7] .............................. H04B 1/10; H04B 7/216; H03D 1/04
(52) U.S. Cl. .......................... 370/342; 370/419; 370/465; 375/254; 375/346; 333/12; 455/234.1; 455/283
(58) Field of Search ...................................... 455/63, 249.1, 455/234.1, 287, 245.1, 295, 574, 306, 126; 333/172, 12; 330/149; 375/200, 1, 206, 346, 285, 254, 341; 370/342, 335, 320, 441, 419, 465

(56) References Cited

U.S. PATENT DOCUMENTS

| 5,105,165 | * | 4/1992 | Bien ........................................ 330/149 |
| 5,126,701 | * | 6/1992 | Adlerstein ............................. 333/172 |
| 5,722,063 | * | 2/1998 | Peterzell et al. ...................... 455/287 |
| 5,758,271 | * | 5/1998 | Rich et al. ......................... 455/234.1 |
| 5,778,310 | * | 7/1998 | Tong et al. ............................ 455/306 |
| 5,854,971 | * | 12/1998 | Nagoya et al. ....................... 455/126 |
| 5,862,465 | * | 1/1999 | Ou ..................................... 455/234.1 |
| 5,896,424 | * | 4/1999 | Uchida et al. ........................ 375/346 |
| 5,907,798 | * | 5/1999 | Abramsky et al. ................ 455/249.1 |
| 5,995,566 | * | 11/1999 | Rickard et al. ..................... 375/346 |

* cited by examiner

Primary Examiner—Ajit Patel
Assistant Examiner—John Pezzlo
(74) Attorney, Agent, or Firm—Dilworth & Barrese, LLP (57) ABSTRACT

A circuit for at least substantially eliminating at least one external interference signal from a radio communications signal received by a code division multiple access (CDMA) mobile phone including a receiving terminal and a low noise amplifier comprises: a plurality of damping devices operatively coupled between the receiving terminal and the low noise amplifier; a plurality of switches respectively operatively coupled between the plurality of damping devices and the receiving terminal; an interference detector operatively coupled to the receiving terminal for detecting the at least one external interference signal from the received radio communications signal; and a switch driver operatively coupled between the plurality of switches and the interference detector, the switch driver generating a switching signal in response to the interference detector to select at least one of the switches in accordance with the at least one detected interference signal in order to vary a gain associated with the received communications signal in accordance with at least one of the damping devices.

14 Claims, 8 Drawing Sheets

CIRCUIT FOR ELIMINATING EXTERNAL INTERFERENCE SIGNALS IN CODE DIVISION MULTIPLE ACCESS MOBILE PHONE

BACKGROUND OF THE INVENTION

1. Field of the Invention

The present invention relates to a code division multiple access (CDMA) mobile phone in a digital communications system and, more particularly, to a circuit for eliminating external interference signals in such a mobile phone.

2. Description of the Related Art

Generally, a digital communications system may be designed to employ CDMA and an advanced mobile phone service (AMPS) which employs frequency modulation. The CDMA cellular system is usually used in dual mode to allow reception of an analog signal. Namely, the system may be used not only in CDMA mode but also in AMPS mode. However, in this case, when communicating in digital signals, there often occurs analog interfering signals which cut a call signal or cause an error in the received digital signals. This error is called intermodulation distortion (IMD), which affects a CDMA mobile phone near an AMPS radio station. A strong external interference signal overloads the low noise amplifier of the CDMA phone so that the IMD component strongly interferes with the CDMA frequency band, causing it to be off-line. An exemplary description of the influence of such interference signals will now be provided.

The received interference signals pass through the low noise amplifier of a conventional CDMA phone to produce second and third order harmonics Eo, which may be expressed by Eq. (1) as:

$$Eo = k_1 Ei + k_2 Ei^2 + k_3 Ei^3 \quad (1)$$

If there are generated dual tones with the same amplitude and different frequencies, the dual tones are expressed by Eq. (2) as:

$$Ei = A(\cos \omega_1 t + \cos \omega_2 t) \quad (2)$$

such that Eo may be further expressed by Eq. (3) as:

$$\begin{aligned}
E_o = &\, k_1 A(\cos\omega_1 t + \cos\omega_2 t) + \\
&\, k_2 A^2 (\cos\omega_1 t + \cos\omega_2 t)^2 + k_3 A^3 (\cos\omega_1 t + \cos\omega_2 t)^3 \\
= &\, k_2 A^2 + k_2 A^2 (\omega_1 - \omega_2) t + (k_1 A + 9 k_3 A^3 / 4)\cos\omega_1 t + \\
&\, (k_1 A + 9 k_3 A^3 / 4)\cos\omega_2 t + 3 k_3 A^3 / 4 \cos(2\omega_1 - \omega_2) t + \\
&\, 3 k_3 A^3 / 4 \cos(2\omega_2 - \omega_1) t + k_2 A^2 \cos(\omega_1 + \omega_2) t + \\
&\, k_2 A^2 / 2 \cos 2\omega_1 t + k_2 A^2 / 2 \cos 2\omega_2 t + \\
&\, 3 k_3 A^3 / 4 \cos(2\omega_1 + \omega_2) t + 3 k_3 A^3 / 4 \cos(2\omega_2 + \omega_1) t + \\
&\, k_3 A^3 / 4 \cos 3\omega_1 t + k_3 A^3 / 4 \cos 3\omega_2 t
\end{aligned} \quad (3)$$

As expressed by Eq. (3), two signals with different frequencies F1 and F2 are amplified to generate non-linear components in the form of the products obtained by multiplying the mixed forms of the second and third orders. The second order mixing is 2F1, 2F2, F1+F2 and F1−F2. Such signals of the mixed component occur outside the narrow band of most systems and, therefore, are negligible. The third order mixing is 2F1+F2, 2F1−F2, 2F2−F1 and 2F2+F1 whose signals cause IMD to occur in the pass band of most systems.

SUMMARY OF THE INVENTION

It is an object of the present invention to provide a circuit for eliminating or at least substantially eliminating external interference signals generated from AMPS stations in a CDMA mobile phone in order to prevent or at least substantially prevent communication errors such as cutting of a call within the area affected by the AMPS station.

In one aspect of the invention, a circuit for at least substantially eliminating at least one external interference signal from a radio communications signal received by a code division multiple access (CDMA) mobile phone including a receiving terminal and a low noise amplifier comprises: a plurality of damping devices operatively coupled between the receiving terminal and the low noise amplifier; a plurality of switches respectively operatively coupled between the plurality of damping devices and the receiving terminal; an interference detector operatively coupled to the receiving terminal for detecting the at least one external interference signal from the received radio communications signal; and a switch driver operatively coupled between the plurality of switches and the interference detector, the switch driver generating a switching signal in response to the interference detector to select at least one of the switches in accordance with the at least one detected interference signal in order to vary a gain associated with the received communications signal in accordance with at least one of the damping devices.

In another aspect of the invention, a circuit for at least substantially eliminating at least one external interference signal from a radio communications signal received by a code division multiple access (CDMA) mobile phone including a receiving terminal and a low noise amplifier comprises: an interference detector operatively coupled to the receiving terminal for detecting the at least one external interference signal from the received radio communications signal; a control voltage generator operatively coupled to the interference detector, the control voltage generator generating a control voltage signal in response to the interference detector; a damping device operatively coupled between the receiving terminal and the low noise amplifier and operatively coupled to the control voltage generator, the damping device including a pair of capacitive elements inductively coupled to one another and operatively coupled between the receiving terminal and the low noise amplifier, the pair of capacitors damping the at least one external interference signal in response to the control voltage signal of the control voltage generator.

In yet another aspect of the inventions a circuit for at least substantially eliminating at least one external interference signal from a radio communications signal received by a code division multiple access (CDMA) mobile phone including a receiving terminal comprises: an interference detector operatively coupled to the receiving terminal for detecting the at least one external interference signal from the received radio communications signal; and a low noise amplifier circuit operatively coupled to the receiving terminal. The low noise amplifier circuit, itself, including: an amplifier having an input terminal and an output terminal; a plurality of switches operatively coupled between the output terminal and the input terminal of the amplifier; and a plurality of feedback resistors respectively operatively coupled between the plurality of switches and the input of the amplifier. The circuit for at least substantially eliminating at least one external interference signal further comprises a switch driver operatively coupled between the interference detector and the plurality of switches of the low noise amplifier circuit, the switch driver generating a switching signal in response to the external interference signal detected by the interference detector and the switching signal selecting at least one of the plurality of switches and thus at least a respective one of the plurality of feedback resistors such that the amplifier of the low noise amplifier circuit amplifies the received radio communications signal with low noise.

In still a further aspect of the invention, a circuit for at least substantially eliminating at least one external interference signal from a radio communications signal received by a code division multiple access (CDMA) mobile phone including a receiving terminal comprises: an interference detector operatively coupled to the receiving terminal for detecting the at least one external interference signal from the received radio communications signal; a control voltage generator operatively coupled to the interference detector for generating a control voltage signal in response to the at least one external interference signal detected by the interference detector; and a low noise amplifier circuit operatively coupled to the control voltage generator and the receiving terminal, the low noise amplifier circuit, itself, including an amplifier having an input terminal and an output terminal; and at least one resistor operatively coupled to the output terminal of the amplifier and to the control voltage generator; such that a gain associated with the amplifier varies in accordance with a control voltage associated with the control voltage signal applied to the at least one resistor.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

In the attached drawings, same reference numerals are used to represent parts serving same functions and detailed descriptions are omitted concerning the parts not essential to describe the inventive concept, for the sake of convenience.

Two factors are considered in detecting IMD signals in the present invention. The first is a received signal strength indicator (RSSI) and the second is a frame error rate (FER) according to the second service option in the normal communications channel. The service option is the standard for the loop-back service option of a terminal. FER is represented by percentage %, calculated in "1-(properly received frames/all received frames). The RSSI is used to consider natural losses of the signal power during transmission from the transmitter to the receiver. Such natural losses include, for example, path loss, free space attenuation, absorption, fading free space attenuation, atmospheric absorption, etc. Equations (4) through (9) which follow, are expressions for the signal power transmitted from the transmitter to the receiver, and provide the RSSI and FER to eliminate the external interference signals from an AMPS station. The power density of a receiving antenna may be expressed by Eq. (4) as:

$$Pr=Pt/(4\pi\, d^2) \qquad (4)$$

wherein "Pt" represents the level of a signal generated by the transmitter, and "d" represents the distance between the transmitter and the receiver. The power PAr received by the receiving antenna may be expressed by Eq. (5) as:

$$PAr=Pr \times Aea \qquad (5)$$

wherein Aea represents effective area and varies in proportion to the antenna gain and $\lambda/4\pi$. The antenna gain G may be expressed by Eq. (6) as:

$$G=\eta(4\pi/\lambda^2)Aea \qquad (6)$$

wherein η represents efficiency. The power PAr received by the receiving antenna may therefore be expressed by Eq. (7) as:

$$PAr=(Pt/(4\pi\, d^2)) \times (c^2/4\pi\, f^2) = (c/4\pi\, fd) \times Pt \qquad (7)$$

wherein Aea/G is $c^2/4\pi\, f^2$, the unit of "d" is kilometers (km), and the unit of "f" is megahertz (MHz). The gain of a signal transmitted from the transmitter to the receiver may be expressed by Eq. (8) as:

$$PAr/Pt=(c/4\pi)^2(1/d^2)(1/f^2) \qquad (8)$$

Further, the free space loss may be expressed in decibels by Eq. (9) as:

$$L(dB)=32.44+20\, \text{Log}(d_{km})+20\text{Log}(f_{MHz}). \qquad (9)$$

Figure 1:
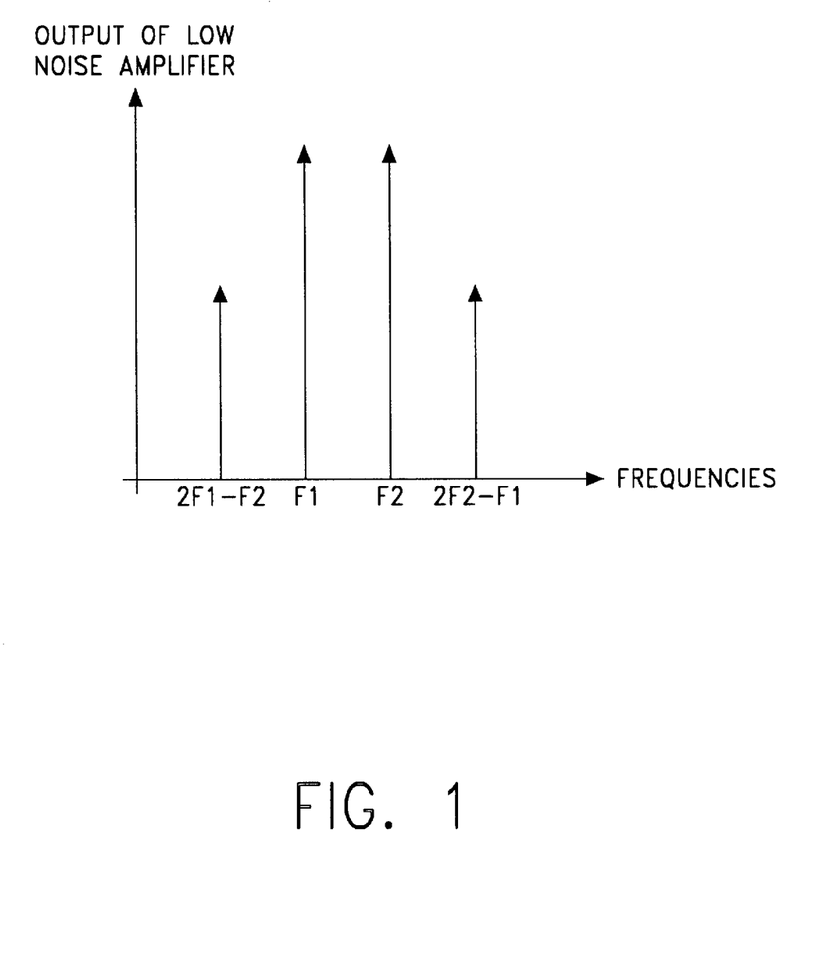
FIG. 1 is a graph illustrating IMD signals versus frequencies.

Referring to FIG. 1, it is shown that the third order IMD signals for dual tone interference are placed in the pass band of the receiver. The third order IMD can be measured by discovering the input third order intercept point (IIP$_3$) in the input terminal. This affects the low noise amplifier. The IIP$_3$ defines the gain characteristics of the first and third order signals for the dual tone signal. Enhancing the first order signal, the input level is increased owing to the characteristics of the low noise amplifier, thus saturated.

Figure 2:
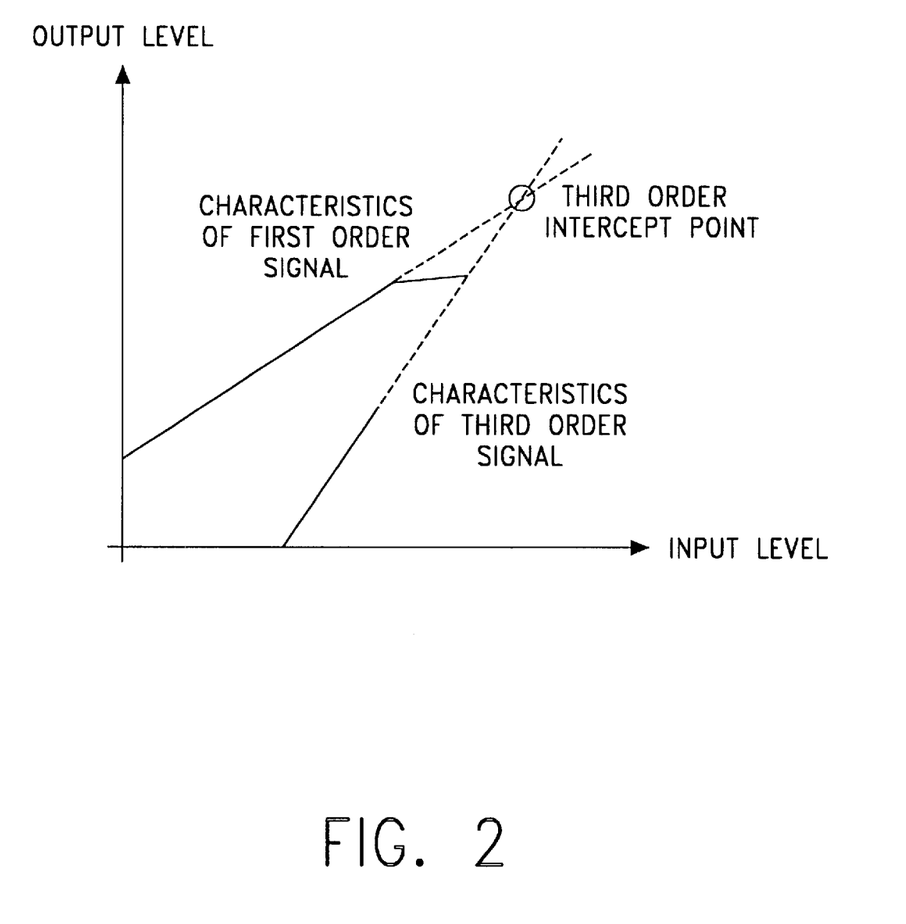
FIG. 2 is a graph illustrating gain characteristics of the first and third orders of an external interference signal.

Referring to FIG. 2, the IMD is increased by the order of 3 dB for 1 dB increase of the first order signal. Namely, the slope is 1/3. Accordingly, the IMD is increased with the external interference to break the originally intended signal to be received by a digital cellular system. Hence, the signal input to the low noise amplifier should be attenuated in order to reduce the external interference signals.

Figure 3:
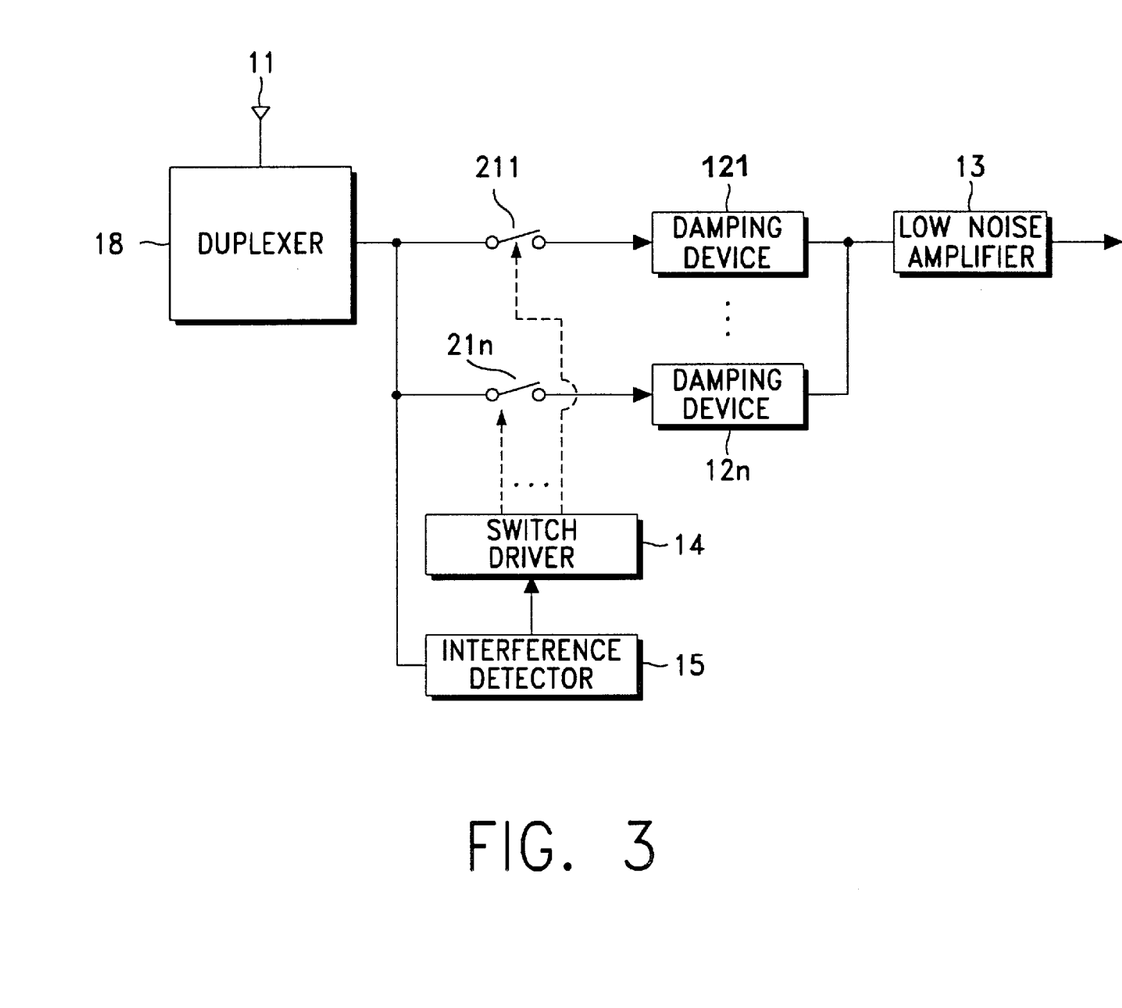
FIG. 3 is a schematic/block diagram of a portion of a CDMA phone circuit for eliminating external interference signals according to a first embodiment of the present invention.

As shown in FIG. 3, according to the invention, a CDMA phone includes a gain variable damping circuit to control the voltage in multisteps. The CDMA phone includes an antenna 11, a duplexer 18 operatively coupled to the antenna 11, and a low noise amplifier 13 for amplifying the received signal to a prescribed level with reducing noises. The damping circuit includes a plurality of damping devices 121–12n operatively coupled to the input of the low noise amplifier 13. Further, the circuit includes a plurality of switches 211–21n respectively operatively coupled between input terminals of the damping devices 121–12n and the duplexer 18. Still further, an interference detector 15, operatively coupled to the switches 211–21n and the duplexer, is provided for detecting the external interference signals from a radio communications signal received through the antenna 11. A switch driver 14, operatively coupled to the switches 211–21n and the interference detector 15, is provided for generating a switching signal to select at least one of the switches 211–21n in accordance with the detected interference signals.

Figure 4:
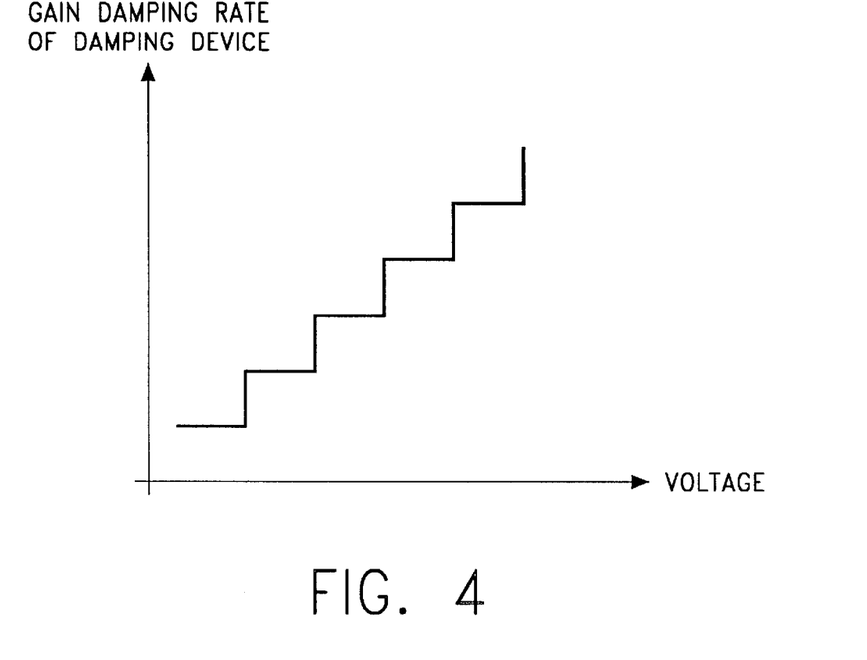
FIG. 4 is a graph illustrating a gain damping rate of a damping circuit versus a control voltage according to the first embodiment of the present invention.

The interference detector 15 evaluates the degree of interference by detecting RSSI (Received Signal Strength Indicator); the rate of average transmission energy per pseudo noise chip (Ec/Io) for a pilot channel, a synchronous channel, a paging channel, a forward directional channel and a power control channel; FER (Frame Error Rate) by the second service option in the forward communication channel; and so forth. The switches 211–21n are selectively turned on to vary the gain before the low noise amplifier 13 according to the measurement of the interference detector 15. The gain damping rate increases in the form of steps with the control voltage as shown in FIG. 4.

Figure 5:
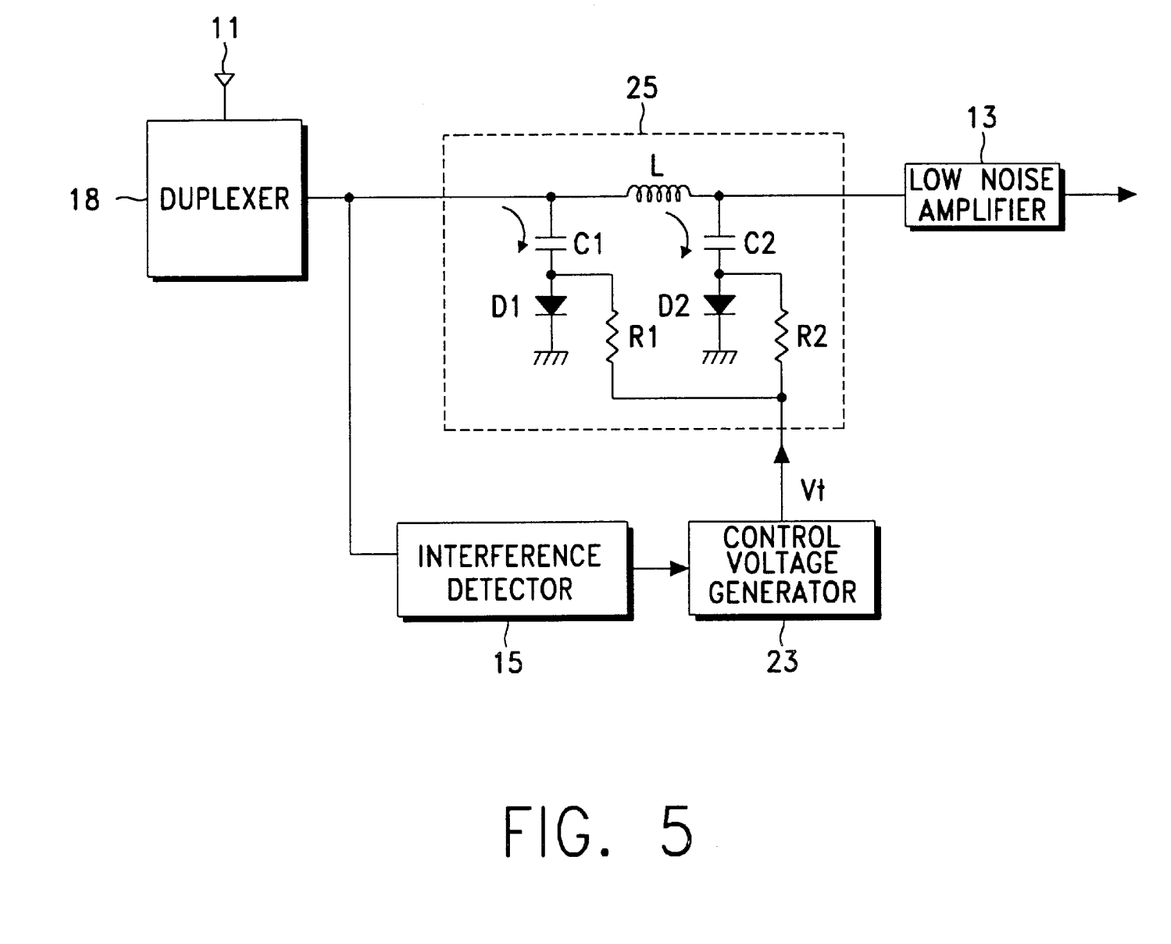
FIG. 5 is a schematic/block diagram of a portion of a CDMA phone circuit for eliminating external interference signals according to a second embodiment of the present invention.
Figure 6:
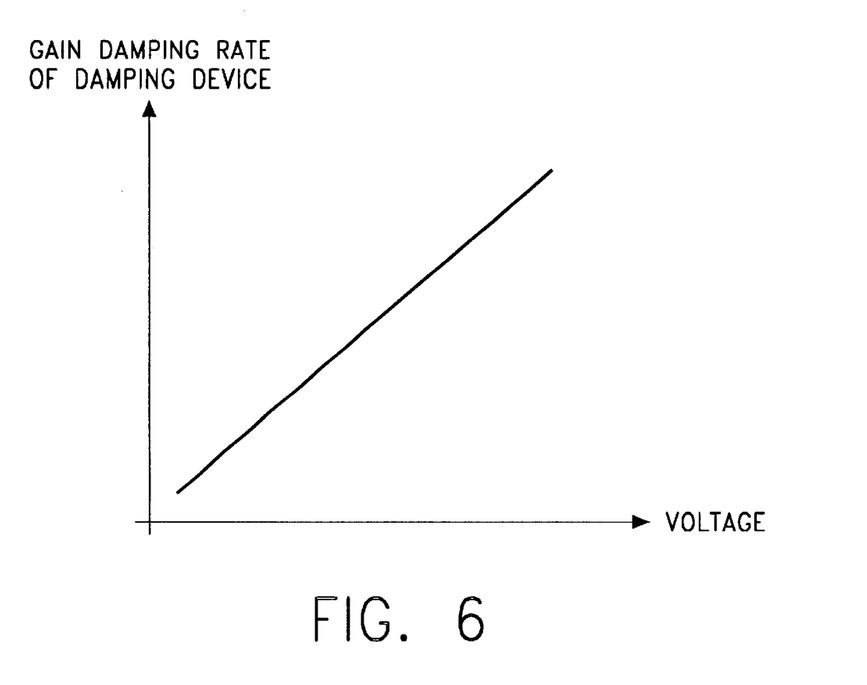
FIG. 6 is a graph illustrating a gain damping rate of a damping circuit versus a control voltage according to the second embodiment of the present invention.

A second embodiment employs pin diodes as shown in FIG. 5, as compared with the first embodiment of FIG. 3 which employs the plurality of the damping devices 121–12n and switches 211–21n, to set the gain. In this embodiment, the damping device 25 consists of an inductor coil (preferably, $\lambda/4$) L connected between the duplexer 18 and the input of the low noise amplifier 13, pin diodes D1 and D2 respectively connected through capacitors C1 and C2, and resistors R1 and R2 connecting the nodes of the capacitors and pin diodes with a control voltage generator 23, which generates a control voltage Vt applied to the nodes according to the interference measurement of the interference detector 15 operatively coupled thereto. The signal transferred from the duplexer 18 to the input of the low noise amplifier 13 is damped by the capacitors C1 and C2, as shown in FIG. 6. Namely, the capacitors C1 and C2 are grounded through the pin diodes D1 and D2 in order to provide such damping. The diodes D1 and D2 increase the current flow as the control voltage Vt increases, thus reducing their resistances. The gain damping rate of the damping device continuously increases with an increase of the control voltage, as shown in FIG. 6.

Figure 7:
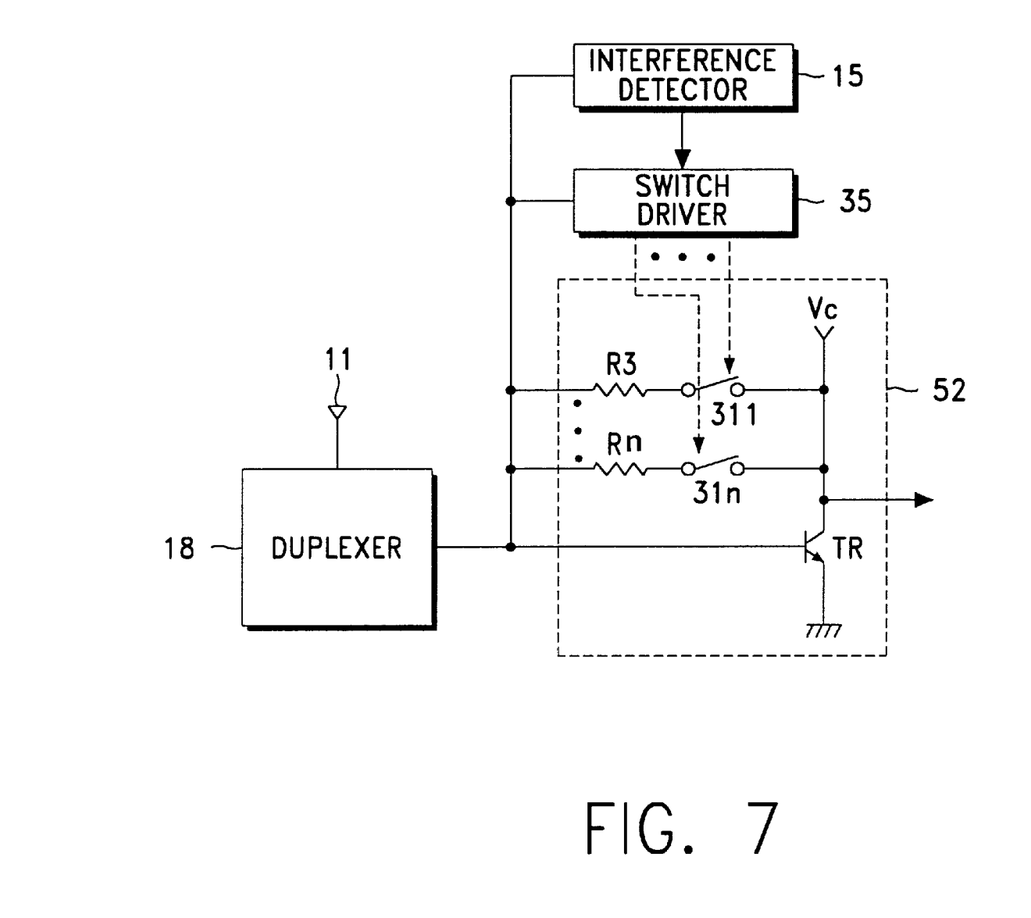
FIG. 7 is a schematic/block diagram of a portion of a CDMA phone circuit for eliminating external interference signals according to a third embodiment of the present invention.
Figure 8:
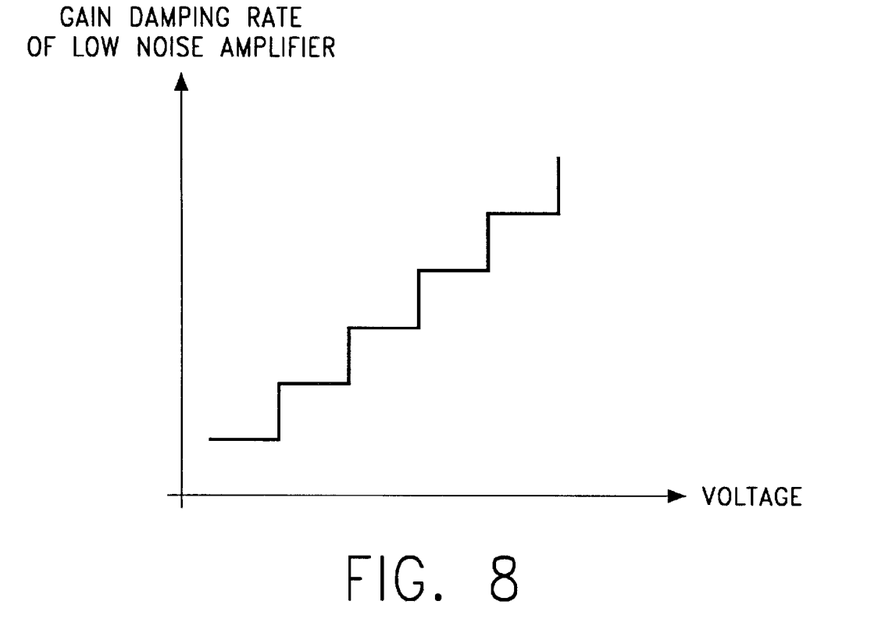
FIG. 8 is a graph illustrating a gain damping rate of a damping circuit versus a control voltage according to the third embodiment of the present invention.

A third embodiment of the present invention employs a transistor for providing low noise amplification whereby a feedback resistance of the transistor is switched in order to vary the gain associated therewith, as shown in FIG. 7. Specifically, a low noise amplifier 52 consists of an amplifying transistor TR having a base terminal, a collector terminal and an emitter terminal. The collector terminal is operatively coupled to first terminals of a plurality of switches 311–31n. Second terminals of the switches 311–31n are respectively operatively coupled to first terminals of a plurality of resistors R3–Rn. Second terminals of resistors R3–Rn are operatively coupled to the base terminal of transistor TR. The emitter terminal is grounded. The switches 311–31n are selectively turned on, respectively, in response to a switching signal generated by a switch driver 35, operatively coupled thereto, according to the interference measurement of the interference detector 15, operatively coupled to the duplexer 18, the switch driver 35 and the resistors R3–Rn, so that the feedback resistance is varied to control the amplifying level, thus resulting in the desired damping. The transistor TR may be an operational amplifier. Nonetheless, with respect to the embodiment of FIG. 7, the gain damping rate of the low noise amplifier increases with the control voltage in the form of steps, as shown in FIG. 8.

Figure 9:
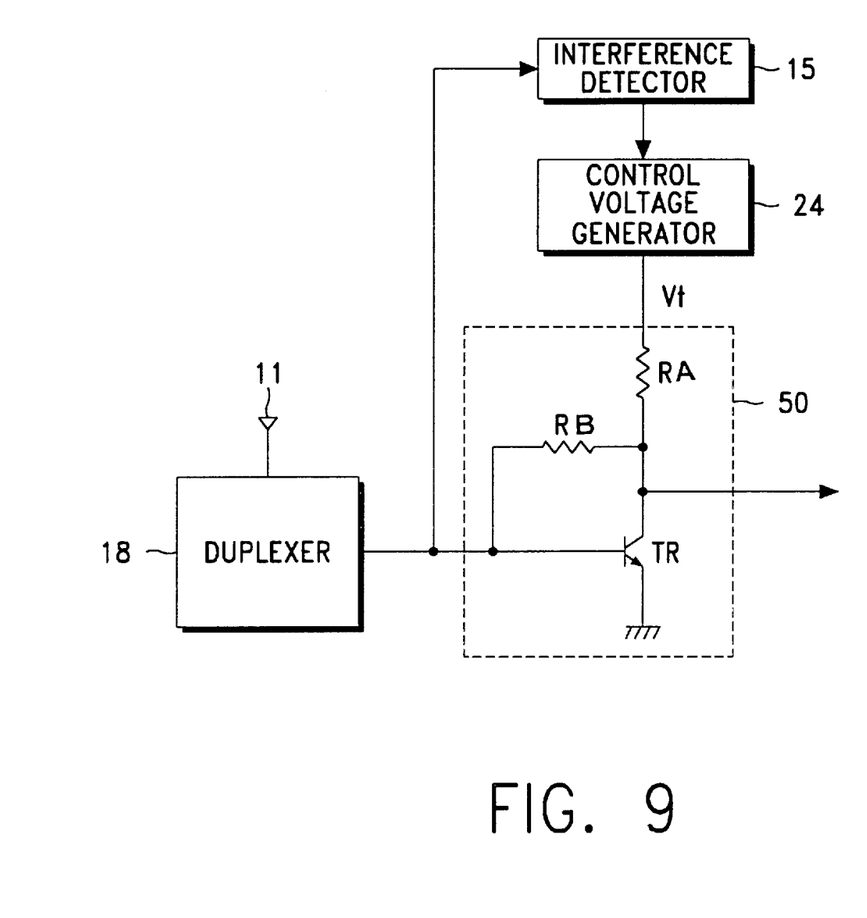
FIG. 9 is a schematic/block diagram of a portion of a CDMA phone circuit for eliminating external interference signals according to a fourth embodiment of the present invention.
Figure 10:
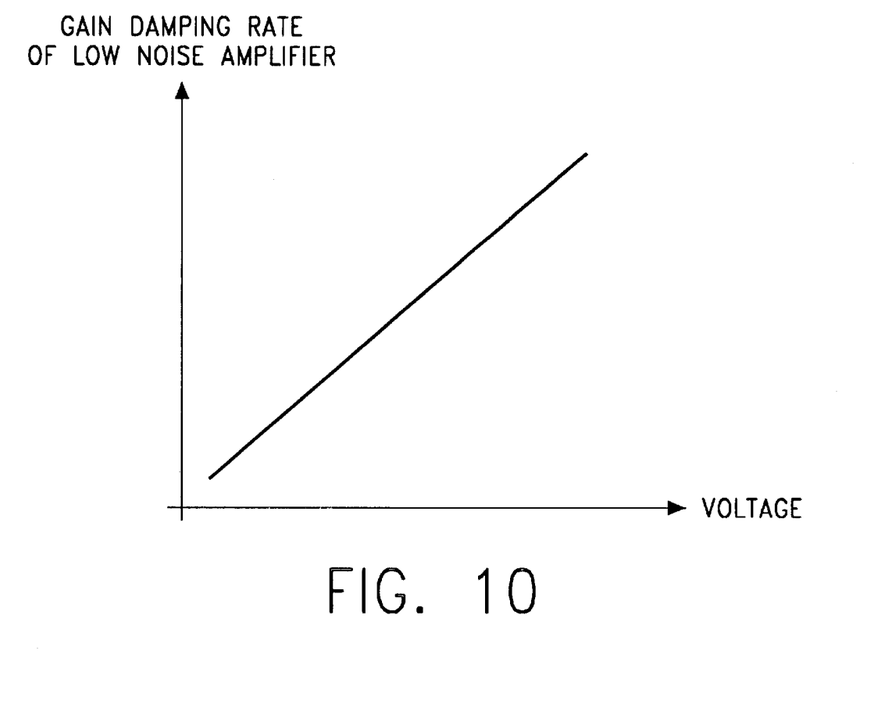
FIG. 10 is a graph illustrating a gain damping rate of a damping circuit versus a control voltage according to the fourth embodiment of the present invention.

A fourth embodiment of the CDMA phone also employs a transistor TR in a low noise amplifier 50 in order to provide the low noise amplification, as shown in FIG. 9. However, in this case, the gain varies continuously with the control voltage, as compared to the third embodiment as shown in FIG. 7, where the gain is set in the form of steps as shown in FIG. 8. The control voltage Vt is supplied from the control voltage generator 24, operatively coupled between the interference detector 15 and the amplifier 50, through a load resistor RA of the transistor TR, depending on the interference measurement of the interference detector 15. Resistor RB provides feedback between the collector and base terminals of transistor TR. Again, the emitter terminal is grounded. The control voltage Vt is controlled to adjust the gain since the gain of the transistor TR may be reduced by lowering the source voltage, i.e., control voltage Vt. The gain damping rate of the low noise amplifier 50 continuously increases with the control voltage, as shown in FIG. 10.

Thus, the inventive CDMA phone with a damping circuit as described herein advantageously eliminates or at least substantially eliminates the external interference signals generated from an AMPS station such that only CDMA signals are processed by the CDMA phone. As a result, communications errors, otherwise caused by the interference, are prevented or at least substantially prevented even in the area of the AMPS station.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A circuit for at least substantially eliminating at least one external interference signal from a radio communications signal received by a code division multiple access (CDMA) mobile phone including a receiving terminal and a low noise amplifier, the circuit comprising:

a plurality of damping devices electrically connected in parallel between the receiving terminal and the low noise amplifier wherein each damping device has a fixed gain;

a plurality of switches respectively operatively coupled between the plurality of damping devices and the receiving terminal;

an interference detector operatively coupled to the receiving terminal for detecting the at least one external interference signal from the received radio communications signal; and a switch driver operatively coupled between the plurality of switches and the interference detector, the switch driver generating a switching signal in response to the interference detector to select at least one of the switches in accordance with the at least one detected interference signal in order to vary a gain associated with the received communications signal in accordance with at least one of the damping devices.

2. The circuit of claim 1, wherein a gain damping rate associated with the circuit increases in steps.

3. A circuit for at least substantially eliminating at least one external interference signal from a radio communications signal received by a code division multiple access (CDMA) mobile phone including a receiving terminal and a low noise amplifier, the circuit comprising:

an interference detector operatively coupled to the receiving terminal for detecting the at least one external interference signal from the received radio communications signal;

a control voltage generator operatively coupled to the interference detector, the control voltage generator generating a control voltage signal in linear response to the interference detector; and a damping device operatively coupled between the receiving terminal and the low noise amplifier and operatively coupled to the control voltage generator, the damping device including a pair of capacitors inductively coupled to one another and operatively coupled between the receiving terminal and the low noise amplifier, the pair of capacitors damping in a linear relationship the at least one external interference signal in response to the control voltage signal of the control voltage generator.

4. The circuit of claim 1, wherein the damping device further includes a pair of pin diodes respectively operatively coupled between the pair of capacitors and ground, whereby resistance values respectively associated with the pair of pin diodes decreases in response to an increase in voltage associated with the control voltage signal such that increased current flows through the respective pairs of capacitors and diodes.

5. The circuit of claim 4, wherein a pair of resistors are respectively operatively coupled between the control voltage generator and a junction point between each capacitor and diode pair.

6. The circuit of claim 4, wherein a gain damping rate associated with the damping device substantially continuously varies in response to a variation in the control voltage of the control voltage signal.

7. A circuit for at least substantially eliminating at least one external inference signal from a radio communications signal received by a code division multiple access (CDMA) mobile phone including a receiving terminal, the circuit comprising:

an interference detector operatively coupled to the receiving terminal for detecting the at least one external interference signal from the received radio communications signal;

a low noise amplifier circuit operatively coupled to the receiving terminal, the low noise amplifier circuit including:

an amplifier having an input terminal and an output terminal;

a plurality of switches each operatively coupled between the output terminal of the amplifier and a corresponding one of a plurality of feedback resistors respectively operatively coupled between the plurality of switches and the input of the amplifier, each of said plurality of switches and said corresponding one of a plurality of feedback resistors being electrically connected in parallel between said input and said output terminals of said amplifier; and a switch driver operatively coupled between the interference detector and the plurality of switches, the switch driver generating a switching signal in response to the external interference signal detected by the interference detector and the switching signal selecting at least one of the plurality of switches and thus at least a respective on of the plurality of feedback resistors such that the amplifier of the low noise amplifier circuit amplifies the received radio communications signal with low noise.

8. The circuit of claim 7, wherein the amplifier is an operational amplifier.

9. The circuit of claim 7, wherein the amplifier is a transistor having a collector terminal for the output terminal and a base terminal for the input terminal.

10. The circuit of claim 7, wherein a gain damping rate associated with the circuit increases in steps.

11. A circuit for at least substantially eliminating at least one external interference signal from a radio communications signal received by a code division multiple access (CDMA) mobile phone including a receiving terminal, the circuit comprising:

an interference detector operatively coupled to the receiving terminal for detecting the at least one external interference signal from the received radio communications signal;

a control voltage generator operatively coupled to the interference detector for generating a control voltage signal in linear response to the at least one external interference signal detected by the interference detector; and a low noise amplifier circuit operatively coupled to the control voltage generator and the receiving terminal, the low noise amplifier circuit including:

an amplifier having an input terminal and an output terminal; and at least one resistor operatively coupled to the output terminal of the amplifier and to the control voltage generator;

such that a gain associated with the amplifier varies in a linear relationship in accordance with a control voltage associated with the control voltage signal applied to the at least one resistor.

12. The circuit of claim 11, wherein the amplifier is an operational amplifier.

13. The circuit of claim 11, wherein the amplifier is a transistor having a collector terminal for the output terminal and a base terminal for the input terminal.

14. The circuit of claim 11, wherein a gain damping rate associated with the circuit substantially continuously varies in response to a variation in the control voltage of the control voltage signal.

* * * * *